March 14, 1950     R. S. SEGSWORTH     2,500,580
CONTROL FOR VARIABLE SPEED TRANSMISSIONS
Filed June 11, 1945     2 Sheets-Sheet 1
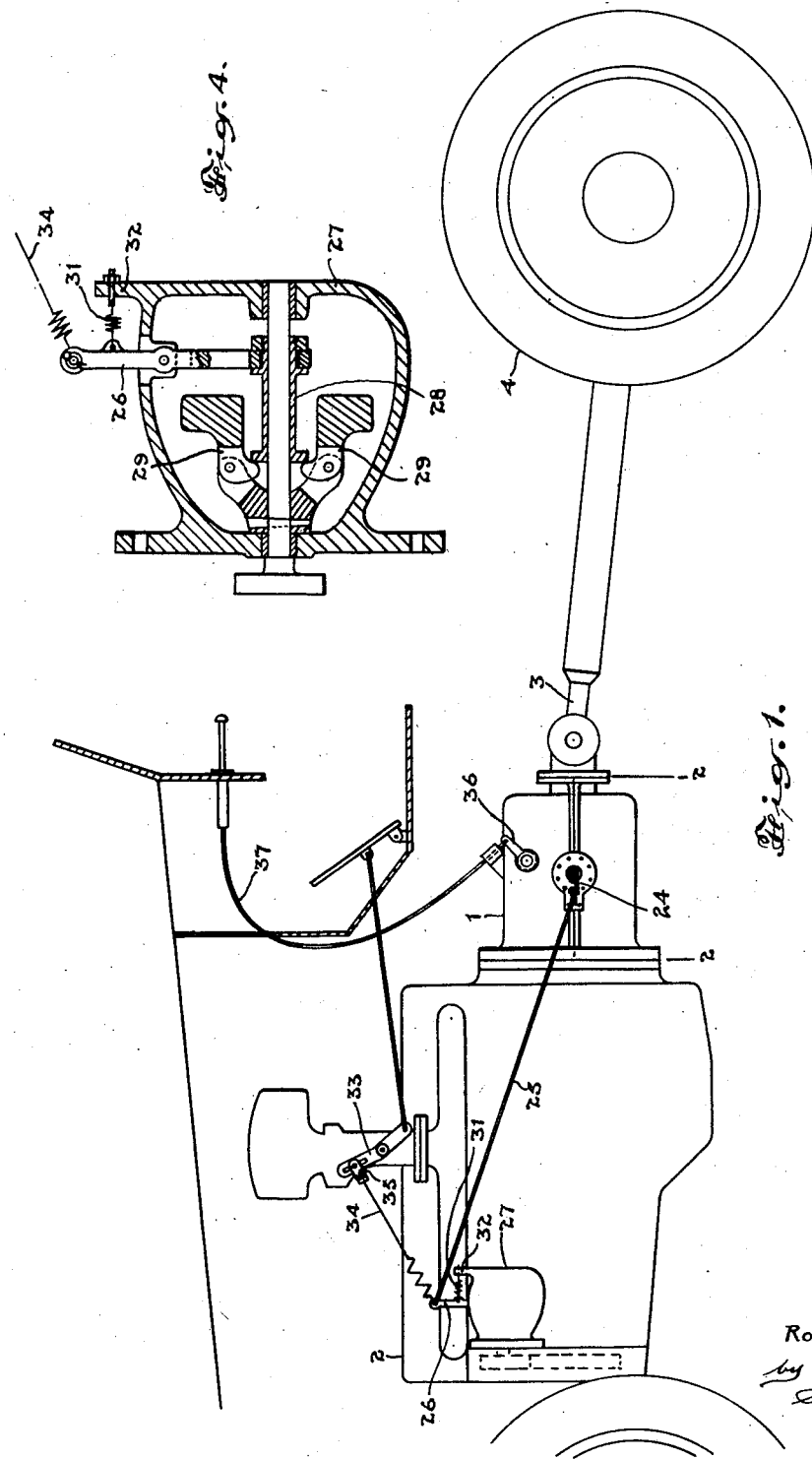
Inventor
Robert S. Segsworth

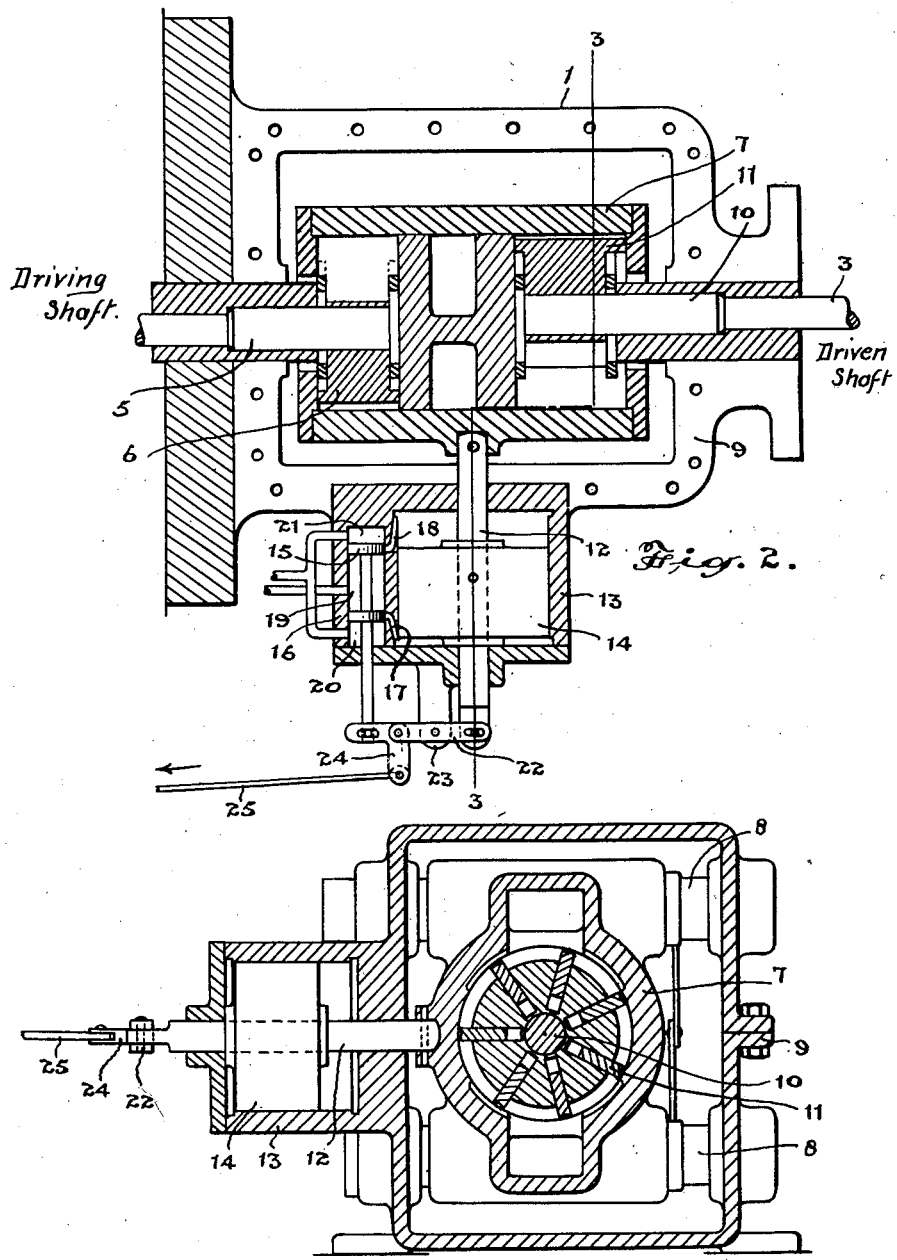

Patented Mar. 14, 1950

2,500,580

UNITED STATES PATENT OFFICE 2,500,580

CONTROL FOR VARIABLE-SPEED TRANSMISSIONS

Robert S. Segsworth, Toronto, Ontario, Canada, assignor to The General Engineering Company (Canada) Limited, Toronto, Ontario, Canada Application June 11, 1945, Serial No. 598,863

3 Claims. (Cl. 60—19)

This invention relates to improvements in means for controlling the operation of a continuously variable speed transmission on motor vehicles and the principal objects of the invention are to maintain approximately constant motor speed during the operation of the vehicle by varying the speed ratio between the motor and the traction wheels, thereby effecting economy in fuel and in operating maintenance of the vehicle.

The power required to move a vehicle varies with the vehicle speed hence the load on the motor is varied in accordance with the ratio between the motor speed and the speed of the traction wheels, therefore, irrespective of the throttle setting of an engine or the power input of an electric motor, changes in the ratio between the speed of the motor and traction wheels varies the load on the motor and conversely if the motor speed is constant, changes in ratio will affect the speed of the wheels.

The principal feature of this invention consists in the novel arrangement of a continuously variable speed transmission between the motor and traction wheels and a speed sensitive governor device driven by the motor operatively arranged to control such transmission to effect a variation in wheel speed while maintaining approximately constant engine speed.

It will be understood that the magnitude of the speed will depend upon the setting of the governor and a further feature of importance in this invention is the provision of means for controlling the governor to vary the range of operating speed.

In the accompanying drawings—

Figure 1 is a diagrammatic illustration of an application of this invention to the engine and traction wheels of a vehicle.

Figure 2 is an enlarged part horizontal mid-section of the variable speed hydraulic transmission taken on the line 2—2 of Figure 1.

Figure 3 is a vertical cross sectional view of the variable speed transmission device and the operating servo-motor taken on the line 3—3 of Figure 2.

Figure 4 is an enlarged vertical longitudinal mid-section of the governor for controlling the variable speed transmission device.

In the application of the present invention as illustrated in the accompanying drawings I have shown a continuously variable speed transmission 1, which is preferably of the type disclosed in detail in my co-pending patent application No. 555,535, now Patent No. 2,393,479 issued Jan. 22, 1946, arranged between the engine 2 and the propeller shaft 3 in place of the conventional clutch and transmission and through which the traction wheels 4 are driven.

The transmission is provided with a drive shaft 5 connected with the engine shaft and on this shaft is mounted a radial vane rotor 6 which operates in one of a pair of cylinder chambers in a cylinder 7. The cylinder 7 is slidably mounted on parallel paired bars 8 arranged transversely of the casing 9.

A driven shaft 10 is offset longitudinally relative to the shaft 5 and has mounted thereon a radial vane rotor 11 similar to the rotor 6 and which operates within a cylinder chamber in the adjustable cylinder 7. The shaft 10 is operatively connected with the propeller shaft 3.

The adjustable cylinder 7 has secured thereto midway of its length a bar 12 which extends through the cylinder 13 secured to or forming part of the casing 9 and the servo-motor piston 14 is mounted on said bar.

A piston valve 15 is slidably mounted in a cylinder 16 arranged alongside of and connected with the cylinder 13 by ports 17 and 18.

Oil under pressure from the engine is fed to ports 20 and 21 adjacent the ends of the cylinder 16 and flows through the ports 17 and 18 as controlled by the movement of the piston valve. Return port 19 leads from the ends of the cylinder 16 and directs the return oil from the cylinder 13.

The rod of the piston valve 15 is operatively connected to the rod of the piston 14 by a lever 22 pivotally mounted intermediate of its length on a bracket 23.

A bell crank lever 24 pivotally supported is pivotally connected to the end of the valve piston rod and this bell crank is connected by a rod 25 with the control lever 26 of a governor device 27.

The governor device 27 may be any suitable type of fly-ball governor driven from the timing gear of the engine and the sliding sleeve 28 mounted on the spindle is operated by the fly-ball levers 29, the sleeve operating the control lever 26 pivotally mounted in the governor casing and extending through a slot therein.

The governor lever 26 is spring-loaded against the operation of the fly-balls by a spring 31 connected to a lug 32 and is adjustable to vary the tension on the lever 26.

The governor lever 26 is operatively connected with the engine throttle lever 33 by a coiled spring wire 34 which is connected to a lug 35 slidably adjustable in a longitudinal slot in the throttle lever 33.

It will be understood that the hydraulic variable transmission is reversible, a reversing lever 36 operating a suitable valve mechanism, as shown in my co-pending application, to reverse the flow of pressure fluid through the radial vane rotors 6 and 11.

In the operation of this device, considering the vehicle to be at rest and the motor idling, the upper end of the governor lever 26, because of the position of the fly-balls and the tension of the spring 31, will be in the extreme right position and the operating rod 25 will have operated the bell crank 24 so that the piston 14 of the servo-motor will be in the extreme outward position holding the cylinder 7 of the transmission in the neutral position so that no oil will be pumped by the input or driving unit 6 and hence no motion will be transmitted to the driven shaft and the traction wheels.

Upon the accelerator of the engine being operated to open the engine throttle the engine speed will be increased. As the engine speed increases, the governor fly-balls move outward and effect a sliding movement of the sleeve and the swinging of the control lever 26 against the restraint of the governor and auxiliary springs. The movement of the control lever 26, through the rod 25 operates the bell crank lever 24 and the piston valve 15 of the servo-motor, thereby admitting pressure oil to the outward end of the cylinder 13 and operating the piston 14 of the servo-motor to move the cylinder 7 of the variable speed transmission out of the neutral position so that oil will be pumped from the driving to the driven side of the transmission.

It will be understood that the piston 14 of the servo-motor will be governed by the movements of the piston valve 15 which controls the entry of pressure oil into the chamber 13, and hence the movement of the piston 14 and the ratio of the transmission will be proportional to the movement of the governor lever 26. The action of the lever 22 connected to the rod of the piston 14 is to limit the displacement of the piston 14 for a given movement of the governor lever 26 by providing a movement to the valve 15 through the bell crank lever 24 following the movement of the piston 14 to shut off the oil entering the chamber 13.

As the motor speed increases, a point will eventually be reached where the centrifugal force acting on the governor balls will be balanced by the governor springs and no further movement will be transmitted to the governor lever and the transmission control.

If the speed of the motor should tend to decrease, the governor lever 26 will be moved in the opposite direction to th described, resulting in the movement of the servo-motor valve and piston to effect an increase in the ratio of the transmission.

It will thus be seen that, by the simple act of depressing the accelerator the vehicle will be caused to move forward with a uniform, smooth, stepless acceleration at a rate depending only on the throttle opening and the resistance offered by the vehicle.

It will be understood that through the control of the transmission as herein described the operation will be the same for reverse as for forward motion.

With the auxiliary spring connection shown and described the motor operating speed will be automatically controlled so that the motor will not operate at an unnecessarily high speed when only a small amount of power is required, but the simple act of moving the accelerator automatically permits increased motor speeds in proportion to the amount of power required whether for rapid acceleration or for cruising speeds.

What I claim as my invention is:

1. Means for controlling the operation of variable speed transmission on motor vehicles comprising the combination with the engine and traction propeller shaft and a transmission device providing a continuously variable speed ratio interposed therebetween, of a speed sensitive governor driven by said engine, a speed ratio control device operatively connected with said transmission, a lever operatively connected with said governor, means connecting said lever and said speed ratio control device, an engine throttle, and extensible spring means connecting said lever and said throttle.

2. Means for controlling the operation of variable speed transmission on motor vehicles comprising the combination with the engine and traction propeller shaft and a transmission device providing a continuously variable speed ratio interposed therebetween, of a speed sensitive governor driven by the engine, a reciprocable speed ratio control member operatively connected with said transmission, a servo-motor operatively connected to manipulate said control member, a bell crank lever operatively connected with said servo-motor, a control lever operatively connected with said governor and with said bell crank lever, an engine throttle, a tension spring member connecting said control lever with said throttle, and means for operating said throttle.

3. Means for controlling the operation of variable speed transmissions on motor vehicles comprising the combination with the engine and traction propeller shaft, and a hydraulic transmission having a reciprocating control device providing a continuously variable speed ratio interposed therebetween operated to vary the speed ratio between the engine and propeller shaft, of means for transmitting reciprocating movement to said control device to control said transmission, a governor device operatively connected with the engine and having a control lever, a rod connecting said control lever with said reciprocating transmission control device, an engine throttle, and adjustable spring loaded means connecting said control lever with said engine throttle.

ROBERT S. SEGSWORTH.

REFERENCES CITED

The following references are of record in the file of this patent:

UNITED STATES PATENTS

| Number | Name | Date |
|---|---|---|
| 1,055,554 | Pearson | Mar. 11, 1913 |
| 1,259,090 | Ferris et al. | Mar. 12, 1918 |
| 2,257,724 | Bennetch | Oct. 7, 1941 |
| 2,384,218 | Tucker | Sept. 4, 1945 |

FOREIGN PATENTS

| Number | Country | Date |
|---|---|---|
| 605,386 | Germany | Nov. 9, 1934 |
| 178,392 | Switzerland | Oct. 1, 1935 |